US012757003B2

(12) United States Patent
Venkataramanegowda et al.

(10) Patent No.: US 12,757,003 B2
(45) Date of Patent: Oct. 6, 2026

(54) METHOD AND APPARATUS FOR BLUETOOTH LOW ENERGY ADVERTISING

(71) Applicant: Microchip Technology Incorporated, Chandler, AZ (US)

(72) Inventors: Kiran Allapattana Venkataramanegowda, Chandler, AZ (US); Andrew M. Bottomley, San Diego, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 249 days.

(21) Appl. No.: 18/806,937

(22) Filed: Aug. 16, 2024

(65) Prior Publication Data

US 2025/0071534 A1 Feb. 27, 2025

Related U.S. Application Data

(60) Provisional application No. 63/534,524, filed on Aug. 24, 2023.

(51) Int. Cl.
*H04W 4/80* (2018.01)
*H04W 8/00* (2009.01)
*H04W 84/18* (2009.01)

(52) U.S. Cl.
CPC ............ *H04W 8/005* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 9,420,407 | B2 * | 8/2016 | Jakusovszky | H04W 48/10 |
| 9,681,381 | B2 * | 6/2017 | Kang | H04W 4/80 |
| 9,853,969 | B2 * | 12/2017 | Enke | H04W 4/80 |
| 9,907,150 | B2 * | 2/2018 | Roquemore, III | G06F 1/3206 |
| 9,992,439 | B2 * | 6/2018 | Lee | H04N 21/42204 |
| 10,779,149 | B2 * | 9/2020 | Zhang | H04W 4/80 |
| 10,812,958 | B2 * | 10/2020 | Thoukydides | H04W 4/80 |
| 11,243,595 | B2 * | 2/2022 | Cheng | G06F 3/167 |

(Continued)

FOREIGN PATENT DOCUMENTS

| | | | |
|---|---|---|---|
| KR | 20220139317 | A | 10/2022 |
| WO | 2023059374 | A1 | 4/2023 |

OTHER PUBLICATIONS

International Search Report & Written Opinion issued on Dec. 2, 2024 in corresponding International Application No. PCT/US2024/042930 (15 pages).

*Primary Examiner* — Tuan A Tran
(74) *Attorney, Agent, or Firm* — Shumaker, Loop & Kendrick, LLP; Ryan M. Corbett

(57) ABSTRACT

A method for advertising a Bluetooth low energy (BLE) peripheral device is provided. The method may include partially booting up a processing circuitry of the BLE peripheral device to enter an advertising mode, transmitting a first advertising packet, receiving a response to the first advertising packet from a BLE central device, wherein the response includes a predetermined time, determining whether a complete boot-up time needed to complete boot-up of the processing circuitry is greater than the predetermined time, and in response to determining that the complete boot-up time is not greater than the predetermined time, completing boot-up of the processing circuitry.

20 Claims, 6 Drawing Sheets

(56) References Cited

U.S. PATENT DOCUMENTS

| | | | | |
|---|---|---|---|---|
| 11,290,954 | B2 * | 3/2022 | Li | H04W 52/0229 |
| 11,317,803 | B2 * | 5/2022 | Wu | A61B 5/686 |
| 12,144,580 | B2 * | 11/2024 | Wu | A61B 5/002 |
| 12,335,342 | B2 * | 6/2025 | Hua | A61B 5/0031 |
| 2019/0104473 | A1 * | 4/2019 | Chun | H02J 50/12 |
| 2019/0384596 | A1 * | 12/2019 | Jeong | G06F 9/24 |
| 2020/0228953 | A1 * | 7/2020 | Thoukydides | H04W 4/80 |
| 2022/0150308 | A1 * | 5/2022 | Hua | A61B 5/0031 |
| 2022/0225879 | A1 * | 7/2022 | Wu | A61B 5/002 |
| 2024/0040348 | A1 * | 2/2024 | Hua | A61B 5/0015 |
| 2025/0031963 | A1 * | 1/2025 | Wu | A61B 5/6869 |

* cited by examiner

METHOD AND APPARATUS FOR BLUETOOTH LOW ENERGY ADVERTISING

CROSS-REFERENCE TO RELATED APPLICATION

This application claims the benefit of U.S. Provisional Patent Application No. 63/534,524, filed on Aug. 24, 2023, which is incorporated herein by reference in its entirety.

TECHNICAL FIELD

The present disclosure relates generally to Bluetooth low energy (BLE) devices, and more specifically to methods and apparatuses for firmware boot-up and initialization for advertising in BLE devices.

SUMMARY

According to an aspect of one or more examples, there is provided a method for advertising for a Bluetooth low energy (BLE) peripheral device. The method may include partially booting up a processing circuitry of the BLE peripheral device to enter an advertising mode, transmitting a first advertising packet, receiving a responses to the first advertising packet from a BLE central device, wherein the response includes a predetermined time, determining whether a complete boot-up time needed to complete boot-up of the processing circuitry is greater than the predetermined time, and in response to determining that the complete boot-up time is less than the predetermined time, completing boot-up of the processing circuitry.

The method may also include exiting, after expiration of the predetermined time, the advertising mode and establishing a connection with the BLE central device, and receiving a data packet from the BLE central device, and transmitting an acknowledgement signal to the BLE central device. The method may also include transmitting, in response to determining that the complete boot-up time is not less than the predetermined time, a negative acknowledge (NACK) signal to the BLE central device, and completing boot-up of the processing circuitry after transmitting the NACK signal. The NACK signal may be transmitted after expiration of the predetermined time. The method may include receiving a data packet form the BLE central device before transmitting the NACK signal. The method may include, after completing boot-up of the processing circuitry, exiting the advertising mode and establishing a connection with the BLE central device, receiving a data packet from the BLE central device, and transmitting an acknowledgement signal to the BLE central device. The partial booting up of the processing circuitry of the BLE peripheral device may include one or more of initializing a random access memory (RAM) and initializing a communication channel. The completing boot-up of the processing circuitry may include booting up a customer application.

According to an aspect of one or more examples, there is provided a method for advertising a Bluetooth low energy (BLE) peripheral device. The method may include partially booting up a processing circuitry of the BLE peripheral device to enter an advertising mode, transmitting a first advertising packet on a first channel, transmitting, in response to not receiving a response to the first advertising packet, one or more additional advertising packets on respective one or more additional channels, in response to not receiving a response to any of the additional advertising packets, exiting the advertising mode and entering a deep sleep mode, in response to receiving a response to any of the additional advertising packets, determining whether a complete boot-up time needed to complete boot-up of the processing circuitry is greater than a predetermined time contained in the response, and in response to determining that the complete boot-up time is less than the predetermined time, completing boot-up of the processing circuitry.

The method may include, after expiration of the predetermined time, exiting the advertising mode, and establishing a connection with the BLE central device, receiving a data packet from the BLE central device, and transmitting an acknowledgement signal to the BLE central device. The method may include, in response to determining that the complete boot-up time is not less than the predetermined time, transmitting a negative acknowledge (NACK) signal to the BLE central device, and completing boot-up of the processing circuitry after transmitting the negative acknowledge signal. The method may include, after completing boot-up of the processing circuitry, exiting the advertising mode, and establishing a connection with the BLE central device, receiving a data packet from the BLE central device, and transmitting an acknowledgment signal to the BLE central device.

According to an aspect of one or more examples, there is provided a Bluetooth Low Energy (BLE) peripheral device. The BLE peripheral device may include a processing circuitry, a memory unit, and a radio. The processing circuitry may complete a partial boot-up process to enter an advertising mode, the radio may transmit a first advertising packet and receive a response to the first advertising packet from a BLE central device, wherein the response may include a predetermined time, the processing circuitry may determine whether a complete boot-up time needed to complete boot-up of the processing circuitry is greater than the predetermined time, and in response to determining that the complete boot-up time is less than the predetermined time, the processing circuitry may complete boot-up.

After expiration of the predetermined time, the processing circuitry may exit the advertising mode and establish a connection with the BLE central device, and the radio may receive a data packet from the BLE central device and transmit an acknowledgement signal to the BLE central device. In response to determining that the complete boot-up time is not less than the predetermined time, the radio may transmit a negative acknowledge signal to the BLE central device, and the processing circuitry may complete boot-up after the radio transmits the negative acknowledge signal. The radio may transmit the negative acknowledge signal after expiration of the predetermined time. The radio may receive a data packet from the BLE central device before transmitting the negative acknowledge signal. After the processing circuitry completes boot-up, the processing circuitry may exit the advertising mode, and establish a connection with the BLE central device, and the radio may receive a data packet from the BLE central device and transmit an acknowledgment signal to the BLE central device. The first advertising packet may be transmitted on a first channel. If the radio does not receive a response to the first advertising packet on the first channel, the radio may transmit one or more additional advertising packets on respective one or more additional channels. In response to not receiving a response to the one or more additional advertising packets, the processing circuitry may exit the advertising mode and enter a deep sleep mode. After the radio receives the response to the first advertising packet, the memory unit may store data received from the BLE central device during the advertising mode.

DETAILED DESCRIPTION OF VARIOUS EXAMPLES

Figure 1:
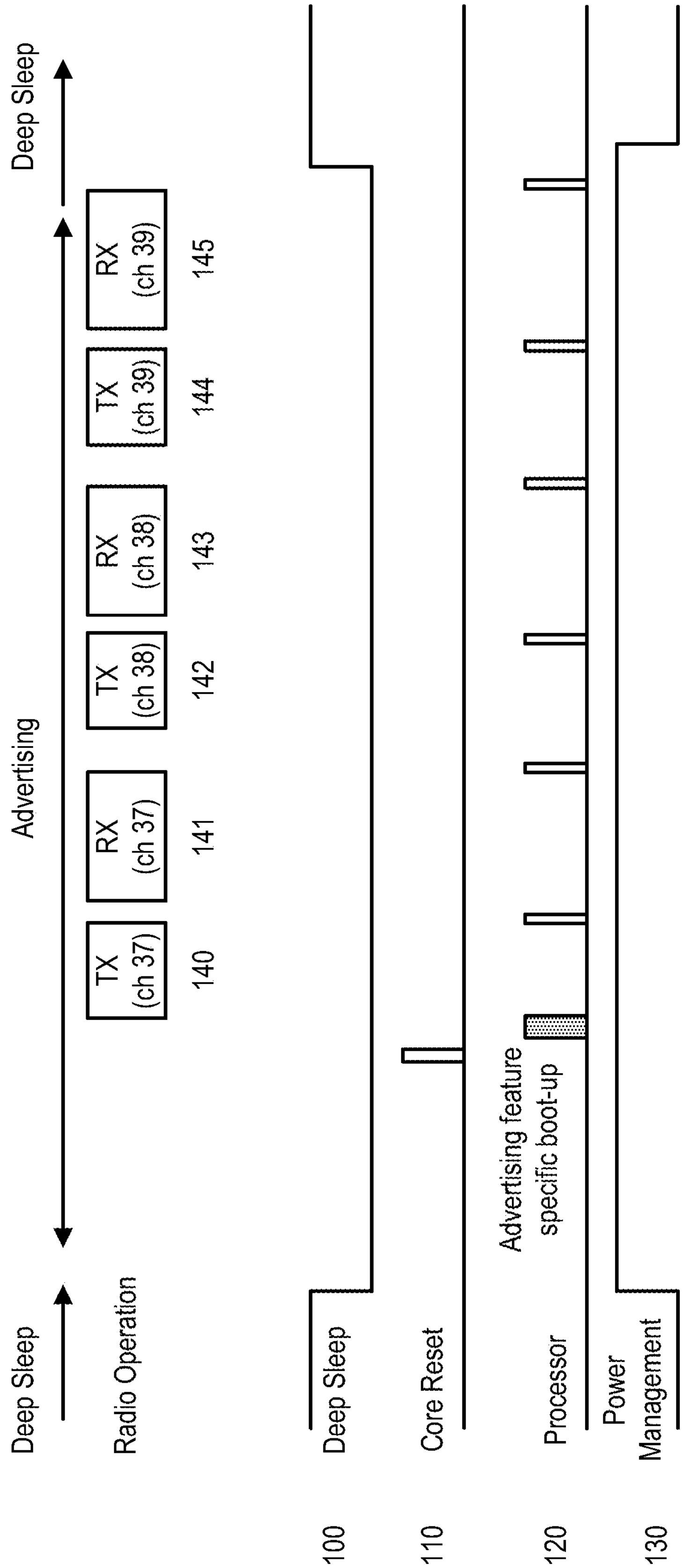
FIG. 1 shows a timing diagram for a method of advertising for a BLE peripheral device according to various examples.

Reference will now be made in detail to the following various examples, which are illustrated in the accompanying drawings, wherein like reference numerals refer to like elements throughout. The following examples may be embodied in various forms without being limited to the examples set forth herein.

The Bluetooth Low Energy protocol provides a communication standard that may be used for low power applications. According to an example embodiment, a BLE peripheral device may be in a low power deep sleep mode most of the time, but may periodically establish a communication link or connection with a BLE central device for a limited time period in order to transmit and receive data before returning to deep sleep mode. For example, a medical implant may be one example of a peripheral device that includes a radio to transmit data to a central device such as an application on a mobile device or a server. The medical implant may operate for many years, but the radio may only need to be connected and transmit data for a small fraction of that time, e.g., 48 hours.

A BLE peripheral device may include many components such as, without limitation, a processing circuitry, random access memory (RAM), and one or more radios that may be turned off during deep sleep mode. When a BLE peripheral device wants to establish a connection with a BLE central device, the BLE peripheral device enters an advertising mode in which the BLE peripheral transmits one or more advertising packets that may be received by one or more BLE central devices. In the deep sleep mode, the current consumption of the BLE peripheral device may be very low, for example approximately 200 nA. In the advertising mode, the current consumption of the BLE peripheral device may increase, for example to approximately 1 uA when averaged over a 5 second advertising period. To enter the advertising mode, and to transmit data once a connection is established, some or all of the components of the BLE peripheral device are turned on.

Figure 5:
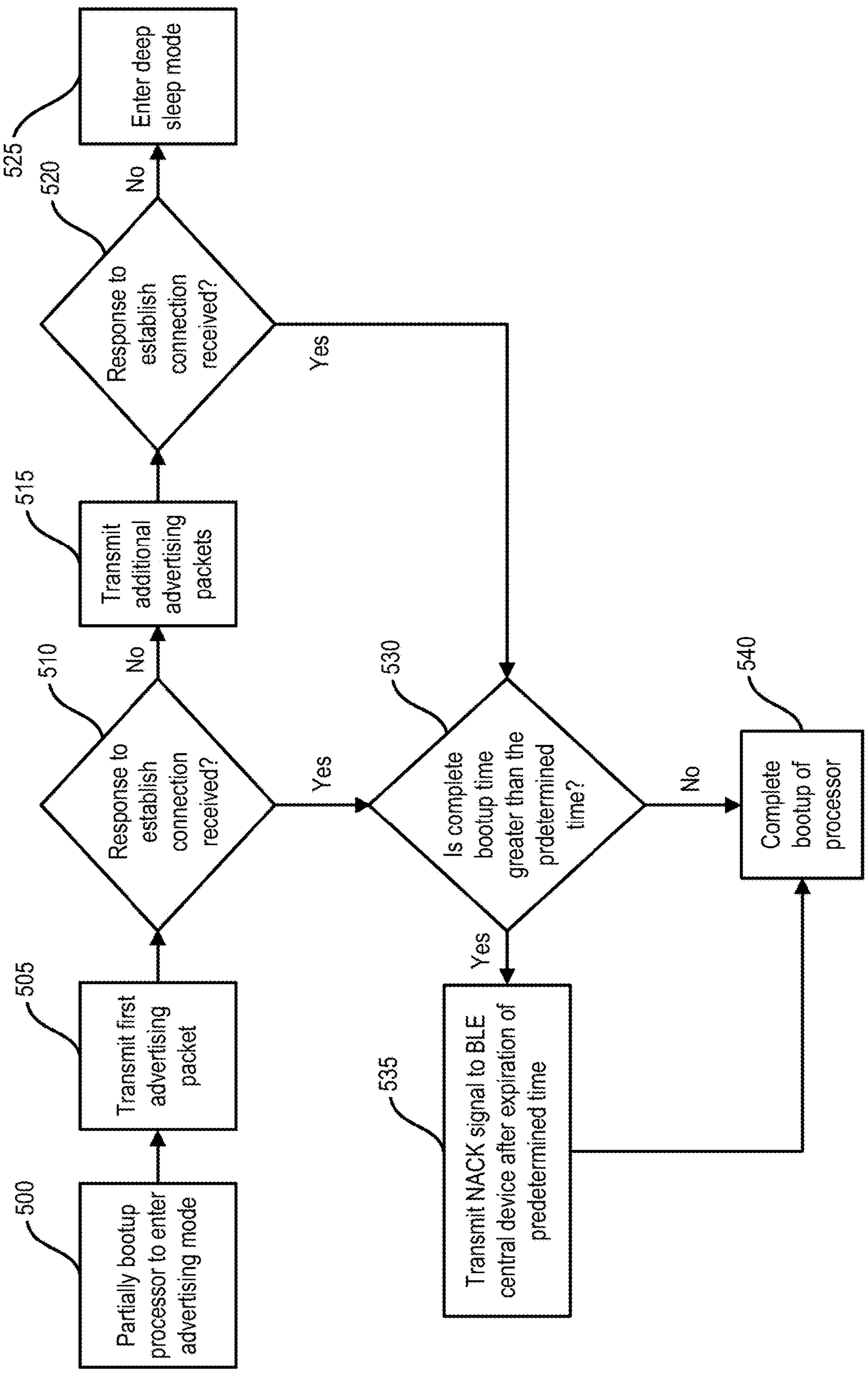
FIG. 5 shows a flow chart illustrating a method of advertising for a BLE peripheral device according to various examples.

FIG. 1 shows a timing diagram for a method of advertising for a BLE peripheral device according various examples. FIG. 5 shows a flow chart illustrating a method of advertising for a BLE peripheral device according to various examples. The following description refers to FIGS. 1 and 5 to describe a method of advertising for a BLE peripheral device according to various examples. As shown in FIG. 1, beginning at the left side of the timing diagram, the BLE peripheral device is in a deep sleep mode, as indicated by waveform 100. During the deep sleep mode, a radio of the BLE peripheral device is turned off, and a processing circuitry of the BLE peripheral device is consuming very low power, as indicated by the logic low level of waveform 120 labeled "Processor" in FIG. 1. As used herein, "a radio" and "a processor" may include one or more radios and one or more processors which may be referred to as "processing circuitry," as one skilled in the art would understand.

Following the timing diagram to the right, at some point in time the BLE peripheral device exits the deep sleep mode (as indicated by the transition from logic high to logic low for the "Deep Sleep" waveform 100), at which point the BLE peripheral device enters an advertising or "Power Management" mode (as indicated by the logic high level of the "Power Management" waveform 130). The advertising or Power Management mode may begin at a predetermined periodic time, or at a time that may be adjusted.

Once the BLE peripheral device is in the advertising or Power Management mode, a core reset signal may begin the advertising process for establishing a connection to a BLE central device, as shown in waveform 110. Before the radio begins transmitting advertising packets, the processing circuitry may be partially booted up to enable a set of link layer features for performing advertising, as shown in operation 500 of FIG. 5. According to one or more examples, the entire link layer, upper stack, and customer application may not be booted up during this partial boot-up, which may be referred to as an advertising feature specific boot-up, or partial boot-up. For example, during the advertising feature specific boot-up, some portions of the RAM may be initialized, and a communication channel for transmitting and receiving packets may be initialized. By booting up certain advertising components, but not booting up or initializing all components of the BLE peripheral device, the amount of power consumed during the advertising or power management mode may be reduced.

Once the partial boot-up, or advertising feature specific boot-up, is completed, the radio may begin transmitting one or more advertising packets. For example, as shown in FIG. 1, and in operation 505 of FIG. 5, the radio (which may include multiple radios) may transmit an advertising packet 140 on a first channel (e.g., channel 37). In operation 510, it is determined whether a response to the first advertising packet has been received that indicates a BLE central device wants to establish a connection For example, the BLE peripheral device may receive a response 141 from one or more BLE central devices on the same channel, which may or may not indicate that the BLE central device wants to establish a connection. If the response does not indicate that the BLE central device wants to establish a connection, or no response is received, in operation 515, additional advertising packets packets may be transmitted, which may be transmitted on different channels. For example, referring again to FIG. 1, the radio of the BLE peripheral device may transmit an advertising packet 142 on a second channel (e.g., channel 38), and may receive a response 143 from one or more BLE central devices on the same channel. If no response is received, or response 143 does not indicate that the BLE central device wants to establish a connection, the radio of the BLE peripheral device may transmit an advertising packet 144 on a third channel (e.g., channel 39), and may receive a response 145 from one or more BLE central devices on the same channel. If no response is received, or it is determined that response 145 does not indicate that the BLE central device wants to establish a connection (in operation 520 of FIG. 50, the BLE peripheral device may exit the advertising or power management mode (as shown by waveform 130), and may re-enter the deep sleep mode in operation 525, as shown by waveform 100 in the timing diagram of FIG. 1.

Figure 2:
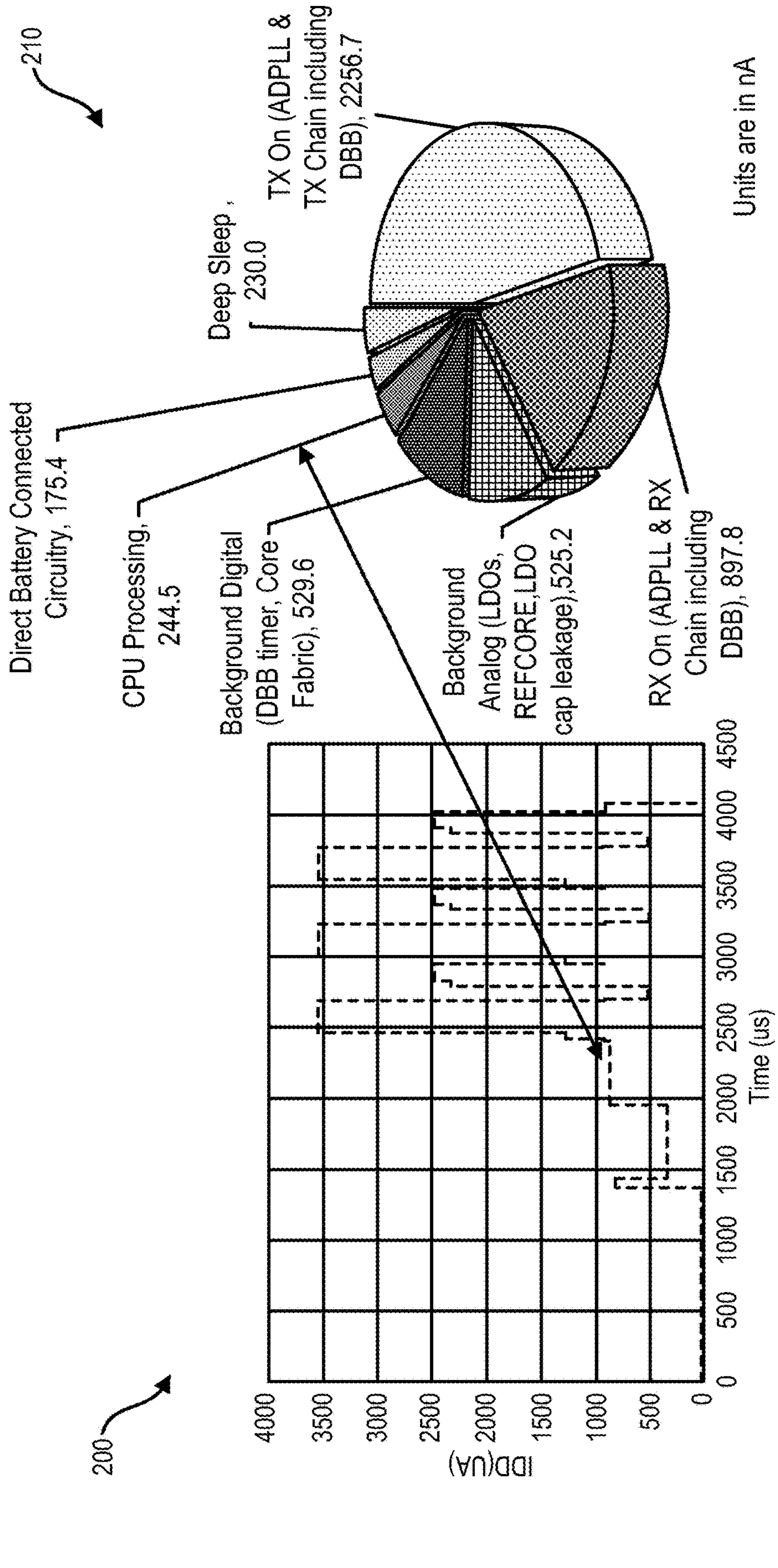
FIG. 2 shows two charts showing current usage during the method of advertising for BLE peripheral device shown in FIG. 1.

FIG. 2 shows two charts 200, 210 showing current usage during the method of advertising a connection with a BLE peripheral device shown in FIG. 1. Chart 200 on the left side of FIG. 2 shows the amount of current (in uA) consumed during the advertising method explained in FIG. 1 as a function of time (in microseconds (us)). As shown in chart 200, the amount of current consumed while the BLE peripheral device is in deep sleep mode, e.g., from approximately zero to 1400 us, is near zero. At approximately 1400 us, the current consumed increases slightly to approximately 800 uA, and then falls to below 500 uA. Just before 2000 us, the processing circuitry begins the partial, or advertising feature specific, boot-up occurs, consuming approximately 900 uA from approximately 1900 us to 2400 us. Chart 210 on the right side of FIG. 2, illustrates the amount of current consumed by BLE peripheral device during the advertising process, allocating the total current consumed across various components and/or functions of the BLE peripheral device. The arrow of FIG. 2 correlates the amount of current consumed by the processing circuitry (labeled "CPU Processing") in chart 210 during the partial or advertising feature specific boot-up shown in chart 200. By performing a partial boot-up, the amount of time needed for the boot-up may be reduced, which may reduce the amount of total current (and power) consumed by booting up the processing circuitry for the advertising method.

Referring again to chart 200 in FIG. 2, the amount of current consumed increases rapidly to approximately 3500 uA three times, which corresponds to the three transmissions of the advertising packets 140, 142, and 144 described above in connection with FIG. 1. The three advertising packet transmissions 140, 142, and 144 correspond to the "TX On" portion of chart 210 of FIG. 2, which accounts for nearly half of the total consumed current. Following the three advertising packet transmissions 140, 142, and 144, there are three respective increases in current consumption of approximately 2500 uA, which correspond to the three receiving operations 141, 143, and 145 shown in FIG. 1. The three receiving operations 141, 143, and 145 correspond to the "RX On" portion of the chart on the right side of FIG. 2, which accounts for nearly one quarter of the total consumed current.

Figure 3:
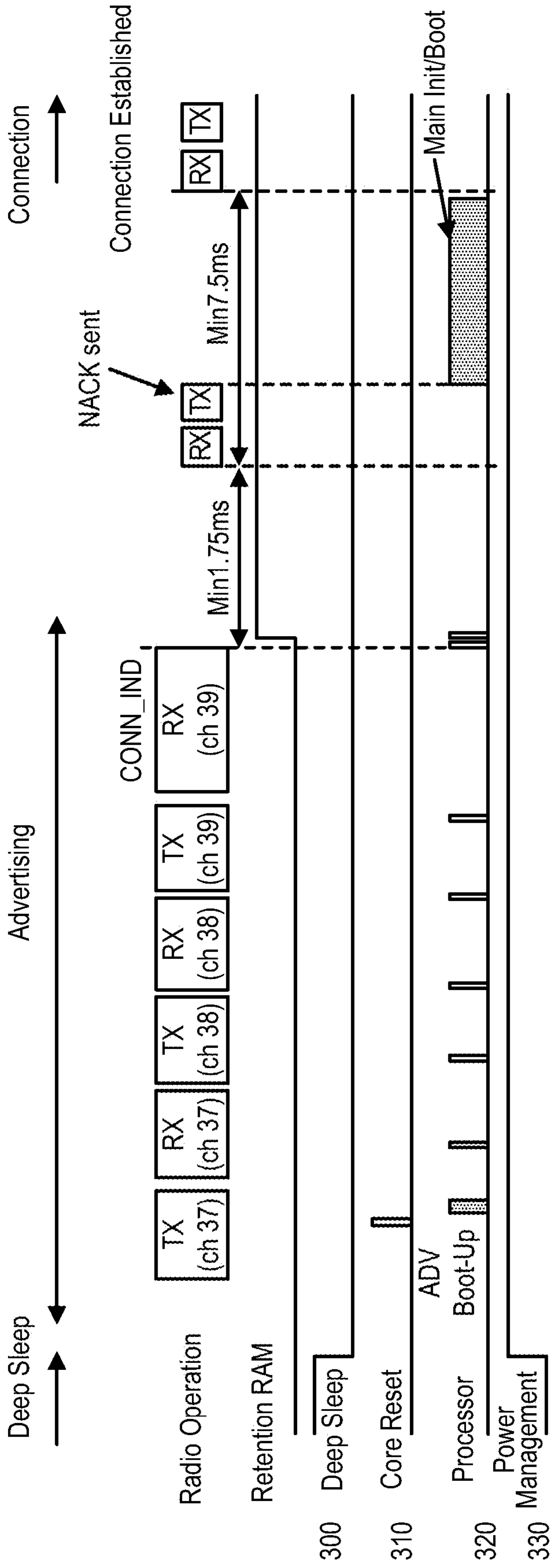
FIG. 3 shows a timing diagram for a method of advertising for a BLE peripheral device according to various examples.
Figure 4:
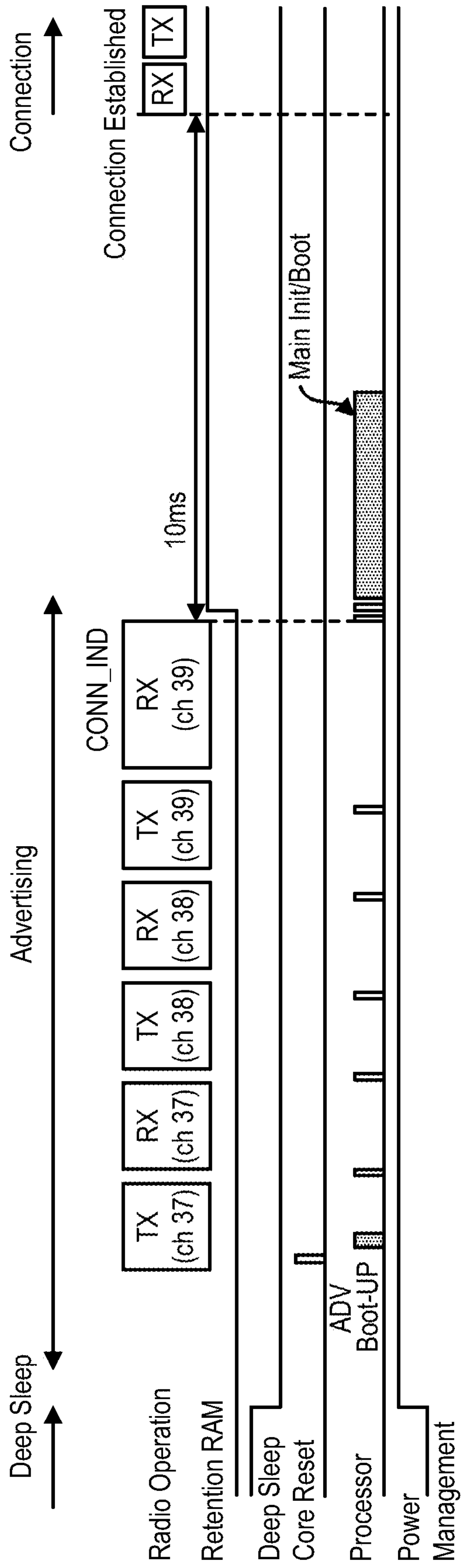
FIG. 4 shows a timing diagram for a method of advertising for a BLE peripheral device according to various examples.
Figure 6:
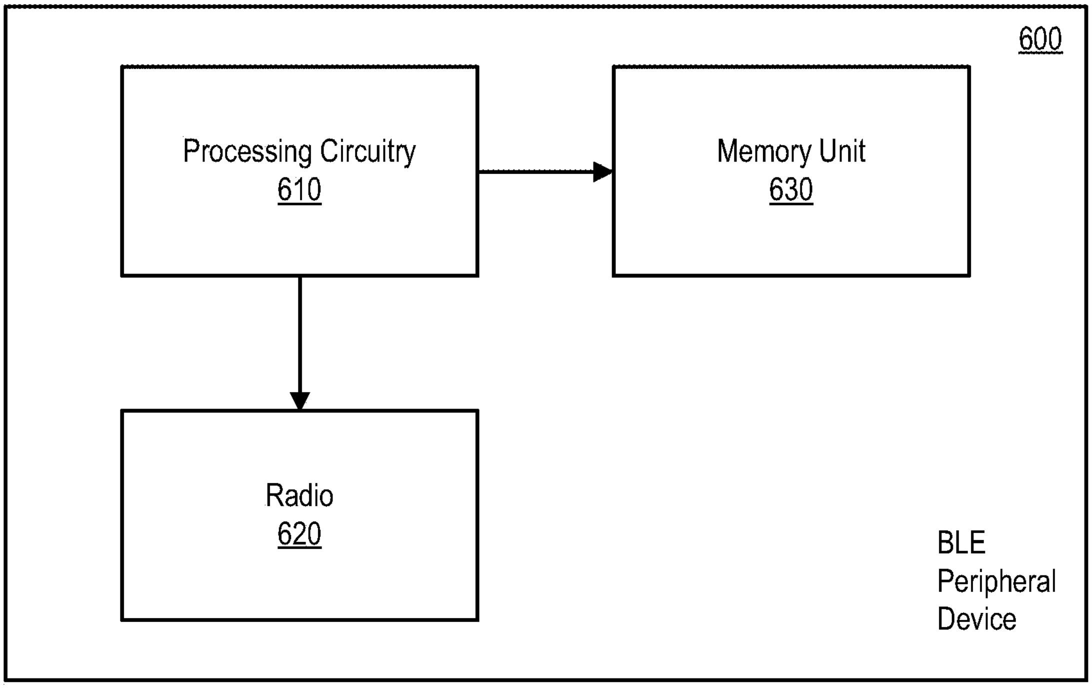
FIG. 6 shows a block diagram of a BLE peripheral device according to various examples.

FIGS. 3 and 4 show timing diagrams for a method of advertising for a BLE peripheral device according to various examples. FIG. 6 shows a block diagram of a BLE peripheral device according to various examples. FIGS. 3 through 6 will now be used to describe a method of advertising a BLE peripheral device according to various examples.

Referring to FIG. 6, a BLE peripheral device 600 may include a processing circuitry 610, which may include, without limitation, one or more microprocessors, microcontrollers, central processing units (CPUs), and Field Programmable Gate Arrays (FPGAs). The BLE peripheral device 600 may include a radio 620 that is coupled to the processing circuitry 610 and that is to communicate with other BLE devices such as a BLE central device. The BLE peripheral device 600 may include a memory unit 630 that is coupled to the processing circuitry 610 and that is to store data received by the radio 620. The memory unit 630 may include various types of data storage devices, such as, without limitation, random access memory (RAM).

The timing diagram of FIG. 3 shows the same timing waveforms for Deep Sleep 110, Core Reset 110, Processor 120, and Power Management 130 as in FIG. 1, along with the transmissions shown in the Radio Operation, but also shows a waveform labeled Retention RAM 350, which indicates that data is saved in the memory unit 630 from the advertising phase to be used in the connection phase after the complete boot process is performed. The timing diagram of FIG. 3 differs from the timing diagram of FIG. 1 in that after the transmission of the advertising packet 344 on the third channel (e.g., channel 39), the radio 620 of the BLE peripheral device 600 may receive a response 345 (e.g., CONN_IND) signal from a BLE central device indicating that the BLE central device wants to establish a connection with the BLE peripheral device 600, and which may specify certain parameters for establishing the connection, such as the time and channel for establishing the connection and a predetermined time. In response to receiving the response 345 from the BLE central device, the memory unit 630 (which is a RAM in the example of FIG. 3) begins retaining data, as indicated by the logic high level of the Retention RAM waveform 350. The radio 620 of the BLE peripheral device 600 may wait a predetermined time set by the central device (e.g., 1.75 ms minimum) before receiving a packet 346. After receiving the packet 346 from the BLE central device, the radio 620 of the BLE peripheral device 600 may transmit a negative acknowledge or NACK signal 347 back to the BLE central device. After transmitting the NACK signal 347, the BLE peripheral device 600 may complete booting up of the processing circuitry 610, as shown by the elongated logic high level 360 of the Processor waveform near the right side of FIG. 3. The complete boot-up step may include booting up the full link layer, upper stack, and the customer application, and may consume significantly more current and power than the partial boot-up, such that by not performing the complete boot-up unless and until a BLE central device indicates the intention to connect, the BLE peripheral device 600 may consume less current and power when no connection is made and the BLE peripheral device 600 returns to the deep sleep mode (operation 525) without establishing a connection.

In response to receiving the NACK signal 347, the BLE central device may re-send the data packet 348 to the BLE peripheral device 600 for establishing the connection to the BLE peripheral device. Referring again to FIG. 3, after the step of completing boot-up is performed, the radio 620 may receive the re-sent data packet 348, establish a connection with the BLE central device, and transmit additional data packets 349.

Referring to FIG. 5, in operation 530 the BLE peripheral device may determine whether the time required for completing boot-up (for example, 5 ms) is greater than the predetermined time set by the BLE central device. As shown in FIG. 3, if the complete boot-up time (for example, 5 ms) is greater than the predetermined time (for example, 1.75 ms), then in operation 535 the BLE peripheral device may transmit the NACK signal 347 back to the BLE central device, and in operation 540 may complete booting up of the processing circuitry, as described above and shown by the elongated logic high level 360 of the Processor waveform 320 in FIG. 3.

If, in operation 530, it is determined that the time required for completing boot-up is not greater than the predetermined time set by the BLE central device, then the boot-up may be completed in operation 540 without sending the NACK signal. The timing diagram of FIG. 4 is similar to the timing diagram of FIG. 3, except that the predetermined time is 10 ms, which is greater than the time required for completing boot-up (for example, 5 ms). Because it is determined that the time required for completing boot-up is not greater than the predetermined time that the BLE peripheral device waits after receiving the response 445 from the BLE central device indicating that the BLE central device wants to establish a connection, then the boot-up may be completed without sending the NACK signal. After boot-up is completed, the BLE central device may wait until expiration of the predetermined time, and then send the data packet 448 to the BLE peripheral device for establishing the connection to the BLE peripheral device. For example, in FIG. 4 the boot-up time is approximately 5 ms, and the predetermined time is 10 ms. The BLE central device will send the data packet at the end of the predetermined time, which may then establish a connection with the BLE central device, after which additional data packets 449 may be transmitted.

Various examples have been disclosed herein, in connection with the above description and the drawings. It will be understood that it would be unduly repetitious to literally describe and illustrate every combination and subcombination of these examples. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method for advertising a Bluetooth low energy (BLE) peripheral device, the method comprising:
- partially booting up a processing circuitry of the BLE peripheral device to enter an advertising mode;
- transmitting a first advertising packet;
- receiving a response to the first advertising packet from a BLE central device, wherein the response includes a predetermined time;
- determining whether a complete boot-up time needed to complete boot-up of the processing circuitry is greater than the predetermined time; and
- in response to determining that the complete boot-up time is not greater than the predetermined time, completing boot-up of the processing circuitry.

2. The method of claim 1, comprising:
- after expiration of the predetermined time, exiting the advertising mode, and establishing a connection with the BLE central device;
- receiving a data packet from the BLE central device, and transmitting an acknowledgement signal to the BLE central device.

3. The method of claim 1, comprising:
- in response to determining that the complete boot-up time is greater than the predetermined time, transmitting a negative acknowledge (NACK) signal to the BLE central device; and
- completing boot-up of the processing circuitry after transmitting the negative acknowledge signal.

4. The method of claim 3, wherein the NACK signal is transmitted after expiration of the predetermined time.

5. The method of claim 4, comprising receiving a data packet from the BLE central device before transmitting the NACK signal.

6. The method of claim 4, comprising:
- after completing boot-up of the processing circuitry, exiting the advertising mode, and establishing a connection with the BLE central device;
- receiving a data packet from the BLE central device; and
- transmitting an acknowledgment signal to the BLE central device.

7. The method of claim 1, wherein the partial booting up of the processing circuitry of the BLE peripheral device includes one or more of initializing a random access memory (RAM) and initializing a communication channel.

8. The method of claim 1, wherein the completing boot-up of the processing circuitry includes booting up a customer application.

9. A method for advertising a Bluetooth low energy (BLE) peripheral device, the method comprising:
- partially booting up a processing circuitry of the BLE peripheral device to enter an advertising mode;
- transmitting a first advertising packet on a first channel;
- transmitting, in response to not receiving a response to the first advertising packet, one or more additional advertising packets on respective one or more additional channels;
- in response to not receiving a response to any of the additional advertising packets, exiting the advertising mode and entering a deep sleep mode;
- in response to receiving a response to any of the additional advertising packets, determining whether a complete boot-up time needed to complete boot-up of the processing circuitry is greater than a predetermined time contained in the response; and
- in response to determining that the complete boot-up time is not greater than the predetermined time, completing boot-up of the processing circuitry.

10. The method of claim 9, comprising:
- after expiration of the predetermined time, exiting the advertising mode, and establishing a connection with the BLE central device;
- receiving a data packet from the BLE central device, and transmitting an acknowledgement signal to the BLE central device.

11. The method of claim 9, comprising:
- in response to determining that the complete boot-up time is greater than the predetermined time, transmitting a negative acknowledge (NACK) signal to the BLE central device; and
- completing boot-up of the processing circuitry after transmitting the negative acknowledge signal.

12. The method of claim 11, comprising:
- after completing boot-up of the processing circuitry, exiting the advertising mode, and establishing a connection with the BLE central device;
- receiving a data packet from the BLE central device; and
- transmitting an acknowledgment signal to the BLE central device.

13. A Bluetooth Low Energy (BLE) peripheral device comprising:
- processing circuitry;
- a memory unit; and
- a radio;
- wherein the processing circuitry is to complete a partial boot-up process to enter an advertising mode;
- wherein the radio is to transmit a first advertising packet, and receive a response to the first advertising packet from a BLE central device, wherein the response includes a predetermined time;

wherein the processing circuitry is to determine whether a complete boot-up time needed to complete boot-up of the processing circuitry is greater than the predetermined time;

wherein, in response to determining that the complete boot-up time is less than the predetermined time, the processing circuitry is to complete boot-up.

14. The BLE peripheral device of claim 13, wherein after expiration of the predetermined time, the processing circuitry is to exit the advertising mode, and establish a connection with the BLE central device; and wherein the radio is to receive a data packet from the BLE central device, and transmit an acknowledgement signal to the BLE central device.

15. The BLE peripheral device of claim 13, wherein in response to determining that the complete boot-up time is not less than the predetermined time, the radio is to transmit a negative acknowledge signal to the BLE central device; and wherein the processing circuitry is to complete boot-up after the radio transmits the negative acknowledge signal.

16. The BLE peripheral device of claim 15, wherein the radio is to transmit the negative acknowledge signal after expiration of the predetermined time.

17. The BLE peripheral device of claim 16, wherein the radio is to receive a data packet from the BLE central device before transmitting the negative acknowledge signal.

18. The BLE peripheral device of claim 10, wherein after the processing circuitry completes boot-up, the processing circuitry is to exit the advertising mode, and establish a connection with the BLE central device; and wherein the radio is to receive a data packet from the BLE central device, and transmit an acknowledgment signal to the BLE central device.

19. The BLE peripheral device of claim 13, wherein the first advertising packet is transmitted on a first channel; and wherein if the radio does not receive a response to the first advertising packet on the first channel, the radio is to transmit one or more additional advertising packets on respective one or more additional channels; and wherein, in response to not receiving a response to the one or more additional advertising packets, the processing circuitry is to exit the advertising mode and enter a deep sleep mode.

20. The BLE peripheral device of claim 13, wherein after the radio receives the response to the first advertising packet, the memory unit is to store data received from the BLE central device during the advertising mode.

* * * * *